(No Model.)
R. W. GIBSON.
SURFACE CONDUIT FOR BUILDINGS.
No. 463,830. Patented Nov. 24, 1891.
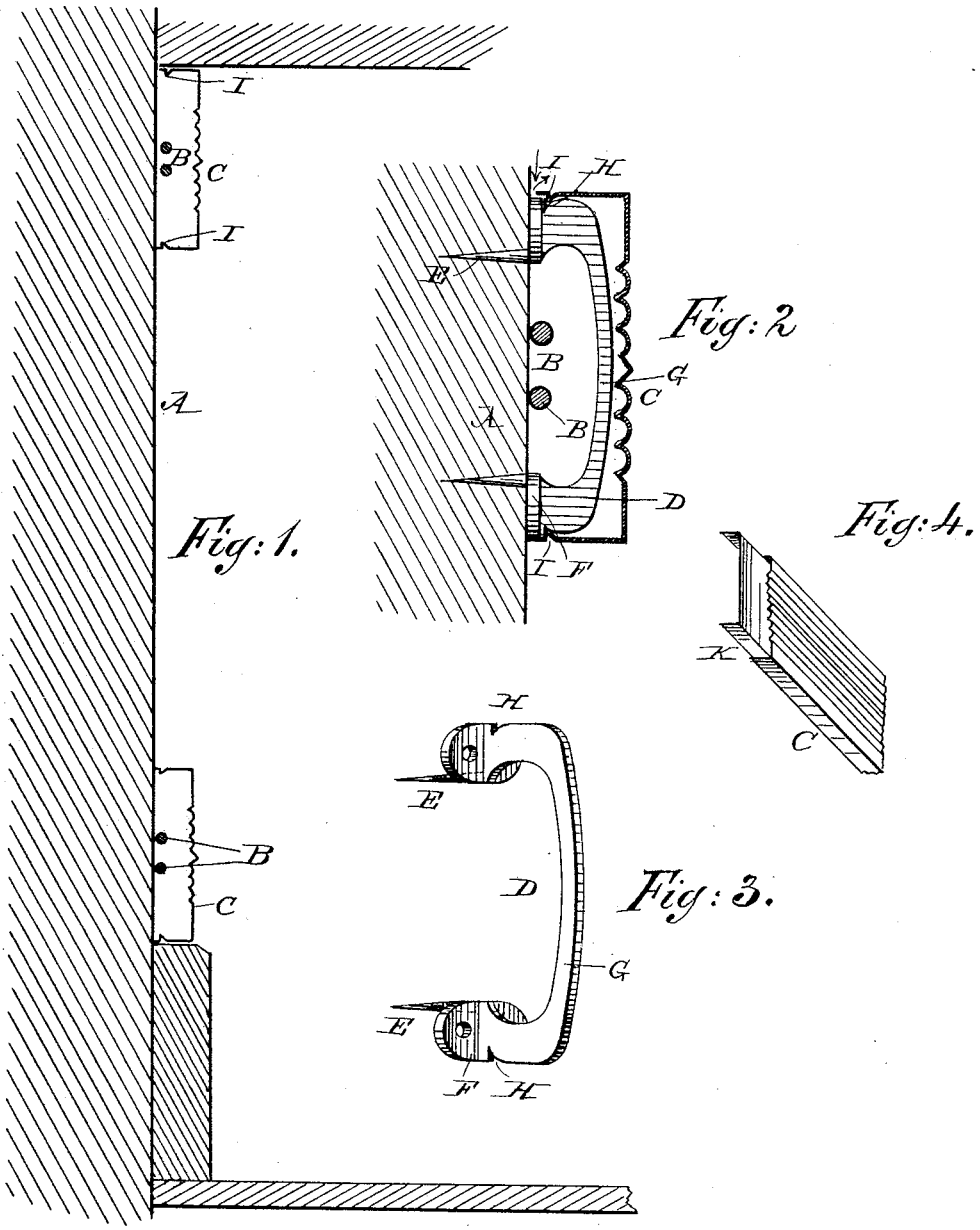
WITNESSES:
Roscoe C. Toombs
Burnham Kalisch
INVENTOR:
Robt. W. Gibson
ATTORNEYS

UNITED STATES PATENT OFFICE.

ROBERT W. GIBSON, OF NEW YORK, N. Y.

SURFACE CONDUIT FOR BUILDINGS.

SPECIFICATION forming part of Letters Patent No. 463,830, dated November 24, 1891.

Application filed February 4, 1891. Serial No. 380,156. (No model.)

*To all whom it may concern:*

Be it known that I, ROBERT W. GIBSON, a citizen of the United States, residing in the city, county, and State of New York, have invented a certain new and useful Improvement in Surface Conduits for Buildings, of which the following is a specification.

My invention relates to conduits for covering electric wires or piping for various uses, running along the walls, ceilings, and interiors of buildings and other structures; and the object of my invention is to provide a conduit for this purpose in which the wires or pipes may be laid after the plastering, woodwork, and the other final operations in building are completed without injury thereto, which will permit of the ready inspection of the wires or pipes for repairs or renewal, which may be made to add to rather than detract from the architectural effects of the interior, and of which provision may be made for the ventilation when necessary or desirable.

In order that my invention may be clearly ascertained, I shall omit further preliminary description and proceed to describe in detail the mode in which I carry the invention into effect, and then point out its various features in the claims.

Reference is to be had to the accompanying drawings, forming part of this specification, in which—

Figure 1 is a cross-sectional elevation representing a conduit embodying my invention applied to an interior wall. Fig. 2 is an enlarged cross-section representing the method in which the said conduit is held on the wall. Fig. 3 is a detail view of the conduit-holding bracket shown in Fig. 2. Fig. 4 illustrates a method of forming a joint in the said conduit.

Like letters of reference designate corresponding parts in the several figures.

A designates an interior finished wall, as of a house, along the surface of which is to be laid a line B of electric wire, or it may be small piping for transmitting power or sound, or a pull cord or wire, or any of the various other kindred contrivances used in the interior of a building. This line B is secured in any appropriate way, as by brads, clips, or guides along, without sinking it in, the surface A.

I cover the line B by a conduit consisting of elongated shell-like sections C, open on the side toward the surface A, and by preference made integral of some material like papier-maché or metal, so that the outside of the conduit may be made ornamental in form to correspond with and form part of the architectural effects of the interior, as illustrated in Fig. 1.

I secure the conduit-sections C removably to the surface A, so that additional lines B may be placed therein, and the existing lines B inspected for repair or renewal at any time. I effect this by means of U-shaped brackets D, formed with spikes E, adapted to be driven into the wall and lugs F, to be nailed or otherwise fastened upon the wall, so as to fix the brackets permanently in a position projecting from the surface A. These brackets D are fixed transversely at intervals along the line B, with their bridges G spanning the line, so as not to interfere therewith and so as to allow of the lines being removed or replaced, or additional lines laid through the openings beneath the bridges G. The inward-opening conduit-section C may be slipped over so as to completely conceal the brackets D, and notches H are formed in opposite sides of the brackets D to be engaged, as by catches, by longitudinal ribs I, projecting inward from the walls of the conduit, which the lateral elasticity of the conduit-sections resulting from their construction will cause to spring into the notches H and hold the conduit-sections securely to but so as to be readily removable from the brackets D.

The joints between the conduit-sections may be made butt to butt, with sockets or with caps, as usual in piping, or with a smaller shell-section, as K in Fig. 4, received as a tenon within the adjoining ends of the conduit-sections.

The angles and intersections of the conduit-sections are made with miters or with blocks or otherwise, as usual in architecture.

This conduit is capable of effective ventilation, when desired, by providing openings therein at suitable points, which openings may in some cases be connected with vent or escape pipes, or by separating the inner edges of the conduit from the surface A, as indicated in Fig. 2.

I claim as my invention—

1. A surface conduit for wires and other lines, consisting of brackets fixed at intervals to the surface and an elongated hollow shell open on the inside and provided on opposite sides with releasable fastenings which engage said brackets on opposite sides, substantially as described.

2. The combination, substantially as hereinbefore set forth, with a line-surface, of brackets fixed at intervals to said surface, a shell-like conduit open on the inside, and catches releasably but rigidly fastening said conduit to said brackets.

3. The combination, substantially as hereinbefore set forth, with a line-surface, of a number of open brackets fixed thereon, and an elastic shell-like conduit sprung over so as to embrace said brackets.

4. The combination, substantially as hereinbefore set forth, with the notched open brackets D, of the shell-like conduit-section C, having catches I.

5. As an improved article of manufacture, an ornamental shell-like conduit-section C, open on one side and formed with internal catch-like ribs I to engage indented brackets D, substantially as described.

ROBERT W. GIBSON.

Witnesses:
H. D. CLAPP,
CHAS. J. POST.